United States Patent [19]

Wu et al.

[11] 4,018,504
[45] Apr. 19, 1977

[54] RETRO-REFLECTIVE MULTIPLE-X OPTICAL SCANNING SYSTEM

[75] Inventors: Paul S. Wu; Michael R. Stroll, both of Randolph, N.J.

[73] Assignee: Sweda International, Inc., Pinebrook, N.J.

[22] Filed: May 2, 1975

[21] Appl. No.: 574,137

[52] U.S. Cl. .................................. 350/7; 250/236
[51] Int. Cl.² ..................... G02B 27/17; H01J 3/14
[58] Field of Search .................. 350/7, 6, 285; 250/234–236, 568, 569; 235/61.11 E; 340/146.3 F, 146.3 D, 146.3 G; 178/7.6

[56] References Cited

UNITED STATES PATENTS

| 3,663,083 | 5/1972 | Friedman et al. | 350/7 |
| 3,728,677 | 4/1973 | Munson | 340/146.3 F |
| 3,818,444 | 6/1974 | Connell | 235/61.11 E |
| 3,889,102 | 6/1975 | Dahlquist | 250/568 |
| 3,916,158 | 10/1975 | Sansone et al. | 250/568 |
| 3,928,759 | 12/1975 | Sansone | 250/236 |

*Primary Examiner*—John K. Corbin
*Assistant Examiner*—Jon W. Henry
*Attorney, Agent, or Firm*—Robert F. Rotella; Norman Friedman; Stephen A. Roen

[57] ABSTRACT

Optical scanning apparatus for scanning and sensing information contained on a label-bearing article includes a light source, a rotatable member having a reflective surface, optical means for directing light from the source to the reflective surface and optical means for directing light reflected from the reflective surface to form a scanning pattern on a predetermined plane; the scanning pattern being comprised of a plurality of segments together forming at least one pair of overlapping X-shaped traces.

12 Claims, 3 Drawing Figures

RETRO-REFLECTIVE MULTIPLE-X OPTICAL SCANNING SYSTEM

BACKGROUND OF THE INVENTION

The present invention relates to optical scanning systems and more particularly to optical scanning systems adapted for use in point of sale (POS) applications where articles bearing coded labels or tags can be automatically read at a scanning station.

The present state-of-the-art of POS techniques has advanced to the point where several approaches have been proposed for automatically reading a label or tag associated with a sale article. The coded information on the label may include such data as the type of article, price, stock number, name of manufacturer, and the like. Obviously, in a retail store situation, any system having the capability of extracting data of this type not only has the advantages of accelerating the flow of checkstand traffic and reducing operator errors but can also provide constantly updated data concerning inventory and sales volume as well as providing the customer a fully itemized sales receipt.

Most recently, in the retail grocery trade, articles are being marked at the source by the manufacturer with a coded label conforming to an industry specification known as the Universal Product Code (UPC). This coded label contains data relating to the name of the manufacturer as well as a catalog or inventory number identifying the particular product. A so-called back room computer addressed by the scanner-decoded manufacturer and product inventory number is capable of looking up the current price as well as current inventory information and making the same available at the checkstand terminal. Such information may be printed on the customer's sales receipt or otherwise made available to supervisory personnel thereby providing continually updated information.

Of the several techniques proposed thus far, all suffer from one or more drawbacks. For instance, an article may bear its associated coded label on the top or bottom or any one of its sides. With known techniques, as the article approaches the scanning area, the checkstand operator must orient the article so that the label faces the scanning slot—otherwise the scanner is unable to scan the label.

Such known techniques also have stringent optical requirements necessitating specially designed optical components such as high precision, unusual configuration lenses and prisms. Needless to say, these components are extremely expensive to manufacture and to align properly within the equipment during assembly and subsequent maintenance.

A further drawback includes the complex scanning pattern necessary to prior art proposals. Typical scanning patterns include Lissajous, multiple-H's and multiple sine curves. These patterns are not only difficult to generate but, since the velocity of the scanning beam in some cases is not constant, the sensed information may be difficult to decode.

In addition, conventional equipment employ sensing techniques which are not truly retro-reflective. That is, the sensor is incapable of viewing only the spot illuminated by the scanning beam but actually views a much larger area. This results in the requirement, in the prior art, for large area sensors and high light levels together with the problem of saturation of the sensor by ambient light pickup.

Prior art systems also require the use of glass plates to cover the scanning slots. This is due to the complex configurations of known scanning patterns which make an open slot arrangement mechanically impossible. The glass plate is subject to scratching as articles are passed over it during scanning operation and must frequently be replaced since the scratched glass curtails the pickup response of the sensor. In addition, products or articles containing a high degree of debris such as produce or which are subject to leakage in the case of meat and dairy products will soil or cloud the glass necessitating frequent cleaning.

SUMMARY OF THE INVENTION

In accordance with the present invention, there is provided an optical scanning system which overcomes all of the hitherto mentioned prior art shortcomings while, at the same time, achieving reliable operation using inexpensive components in a simple, easily assembled, yet novel, design.

The scanner according to the invention has the capability of scanning the label portion of an article which appears on any one of its sides or on the bottom. Thus, for instance, as an article approaches the scanning slot, the label which may appear rear side thereof, is able to be read by the scanner without the need of the checkstand operator orienting the article so that the label is facing the scanner.

Additionally, the inventive scanner has the capability of reading the label if it appears on the left or right sides, bottom, or front of the packages. Even articles packaged in irregular configurations, such as produce, or packages which have become deformed through mishandling can be read by the scanning system according to the principles of the invention. Thus, the customer or checkstand operator need not undergo the tedious and time-consuming process of sorting and orienting all of the articles prior to scanning.

A further advantage of the present invention is the use of optical components which are conventional and widely available at relatively low cost. Furthermore, the optical components are of a relatively small physical size, thereby insuring the compactness of the scanning equipment as well as reducing the cost thereof. Because the equipment in accordance with the invention is of straightforward design, alignment during manufacture as well as any subsequent maintenance is readily achieved without the use of sophisticated alignment or calibration equipment.

Still another advantage of the present invention is the simple scanning pattern comprising, in the preferred embodiment, a double-X pattern. Such a pattern is not only easy to generate, as will be taught herein, but also provides th capability of scanning a label appearing on either the front, sides, rear or bottom portions of the article. Since each leg of the X is linear, scanning velocity is constant thereby simplifying design of the associated decoder.

Due to the fact that the inventive scanner utilizes a truly retro-reflective sensing technique, only the spot area actually illuminated by the scanning beam is viewed by the sensor. Accordingly, the present sensor is highly immune to ambient light interference. In addition, the sensor dimension may be considerably reduced in contrast with prior art sensing elements.

A yet further advantage is the provision for the plate incorporating the scanning slots to be open, thereby, avoiding the use of a glass cover plate which is subject to scratching and clouding. The inventive plate, containing open slots, requires no cleaning nor is any portion subject to wear or scratching which would affect the scanning pickup response.

These and other advantages are achieved in the present invention which comprises a light source such as a laser directed through a series of adjusting lenses to a beamsplitter which divides the incoming ray into two rays. These two rays are each reflected off mirrors onto opposite sides of a rotator drum having reflective faces. As the drum rotates, the pair of light beams striking the reflective faces of the rotator are reflected back, forming sweep tracings which fall upon the surfaces of an additional pair of mirrors. The latter pair of mirrors is angled to direct the sweep tracings so that they fall within the plane on which the scanning slots are provided. By suitable arrangement of the optical geometry a multiple X scanning pattern is obtained.

DETAILED DESCRIPTION OF THE INVENTION

Figure 1:
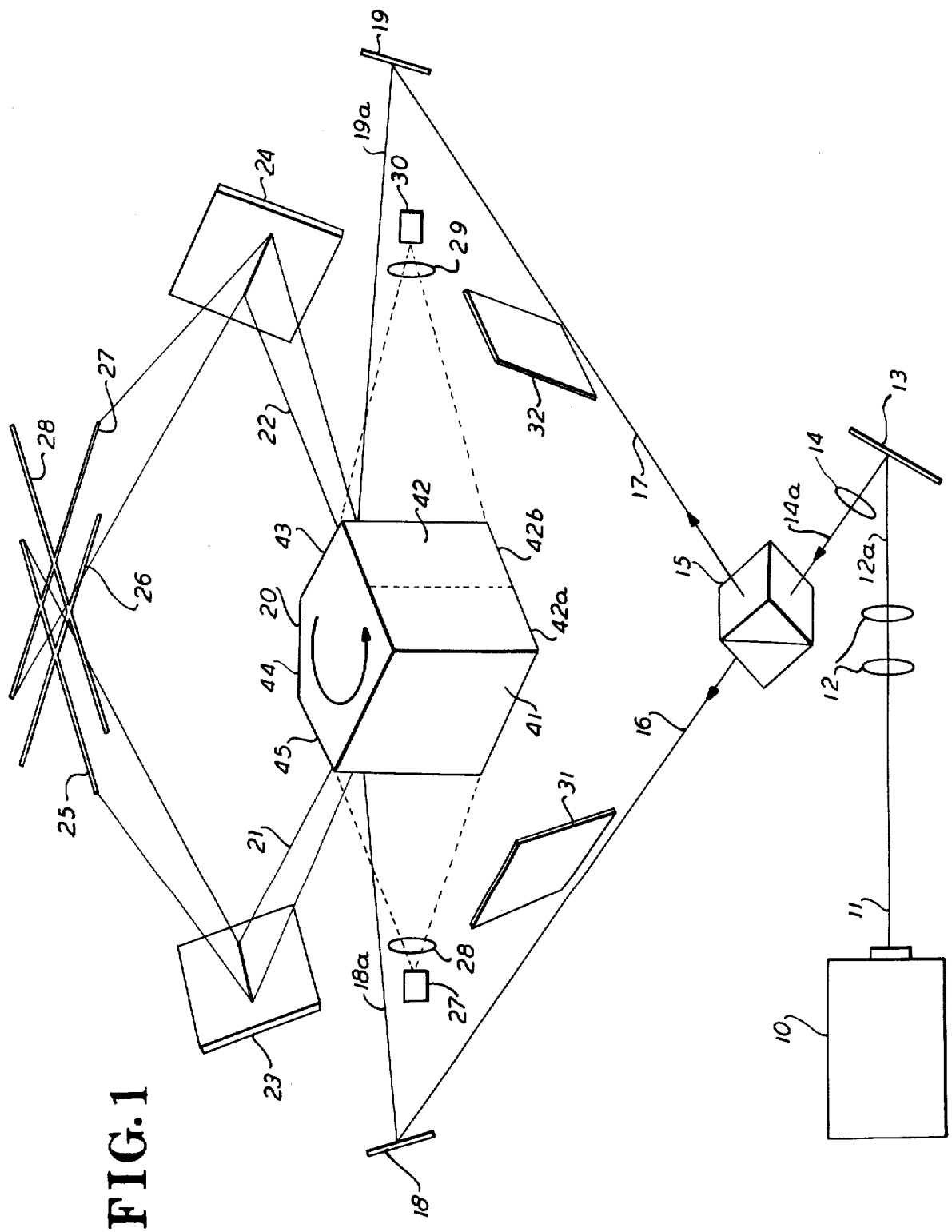
FIG. 1 is a perspective diagram showing the inventive scanner apparatus.

Referring now to FIG. 1, the output of a light source 10, such as a laser capable of emitting a highly collimated beam of light 11 is directed through a combination of a convex and a concave lens or through a pair of convex lenses forming a beamforming lens pair 12 which changes the diameter of the light beam by enlarging it while maintaining the collimated characteristic of the beam. A mirror 13 directs the widened light beam 12a through a convex lens 14 onto a beamsplitter 15.

Lens 14 is selected to have a focal length determined by the length of the optical path from lens 14 to the scanning slot 25–28, the object being to converge the light ray at the plane in which the slot lies.

Beamsplitter 15 may be a partially transmissive front surface mirror or a beamsplitting cube having a square cross sectional area. The light beam 14a falling on beamsplitter 15 is split into two rays 16 and 17 of approximately equal intensity. Ray 16 is directed to a fixed mirror 18 while ray 17 is directed towards another fixed mirror 19. Mirrors 18 and 19 are located 180° apart in the preferred embodiment. However, additional mirrors may be provided disposed in other angular arrangements depending on the design of the remaining optical components.

Rotator 20 is a drum having reflective faces 41, 42, 43, 44, and 45. Although rotator 20 is here shown as containing five reflective faces thereby forming a regular pentagon along a cross-section perpendicular to the axis of rotation, any number of faces may be chosen as a design consideration.

A further refinement of the design of rotator 20 makes possible an improvement of the system scan duty cycle thereby reducing the information bits rate processed by the decoding circuitry, simplifying the design of the latter.

Consider the exemplary representation of rotator 20 shown in FIG. 1 as being a regular pentagon in cross-section. Thus, the vertex angle, or the angle between faces is 108°. Each of the faces may be divided longitudinally into two half sections such as sections 42a and 42b which are angled with respect to each other.

A ten-sided rotator is thereby created with a corresponding doubling of the number of reflective faces. The geometrical properties of such a rotator might be typically as follows: for an angle between the divided sections, such as between sections 42a and 42b, of 174°, the new vertex angle between adjacent sections such as between the divided right half of face 41 and section 42a, would be 114°.

Obviously, other values for the angular relationships between the divided sections and the main faces could be selected according to the invention.

Rotator 20 may also take the configuration of a right pyramid or right pyramidic frustrum having n sides, each of the sides being reflective.

Light rays reflected from the surfaces of mirrors 18 and 19 impinge upon the reflective faces of rotator 20 and are reflected back. As the rotator turns (which may be either clockwise or counterclockwise, as shown) a light ray falling upon one of its faces will be reflected as a moving or sweeping spot, the velocity of which depends on the angular velocity of the rotator.

Mirrors 23 and 24 are angled with respect to the axis of rotator 20 so that as the latter rotates, the locus of light rays reflected from the rotator will trace straight line patterns on a plane surface such as that of mirrors 24 and 23, respectively. These straight light traces are then reflected by virtue of the angular orientation of mirrors 23, 24 to a plane perpendicular to the axis of rotator 20. By appropriately locating and angling mirrors 23 and 24, each straight line trace can be made to intersect in the scanning slot plane thereby forming an X-pattern with a 90° angle between each leg of the X.

Accordingly, the light trace reflected from mirror 24 will intersect the scanning slot plane to form a leg 27 of one X. At an interval of time later, determined by the speed of rotation of rotator 20, the light trace reflected from mirror 23 will intersect the scanning slot plane to form leg 25 of another X.

It is to be understood that although the drawing, for explanatory purposes, apparently indicates both legs 27, 25 being formed simultaneously by reflection of the traces from their respective mirrors 24, 23 in actual operation each leg of each X is formed in a sequential fashion.

At time zero, ray 22 reflected from face 43 of rotator 20 just strikes right edge of mirror 24. Ray 18a is reflected from rotator face 45 and just misses the left edge of mirror 23 and falls into blank space. As rotator 20 turns, ray 22 sweeps across mirror 24 from right to left thereby forming the first scanning beam 27—also sweeping from right to left.

At some time later, ray 22 has reached the left edge of mirror 24 and then falls into the blank space between mirrors 24 and 23. Ray 19a then falls upon rotator face 42. The ray reflected from rotator 20 will initially strike the left edge of mirror 32 and sweep towards the right mirror edge thereby forming the second scanning beam 28 which sweeps from left to right. During this portion of the cycle ray 18a is reflected by face 45 into the void between mirrors 23 and 31.

At a further time, ray 18a is reflected from the rotator onto the left edge of mirror 31 thereby forming the third scanning beam 26, sweeping left to right. During this phase, ray 19a is reflected by the rotator into the empty space between mirrors 32 and 24.

Finally, ray 18a is reflected as ray 21 from the rotor onto the right edge of mirror 23 which forms the fourth scanning beam 25 sweeping from right to left. Ray 19a is reflected into the space between mirrors 32 and 24.

It is to noted that angled mirrors 24, 23, 31, 32 are equiangularly situated with respect to the axis of rotator 20 along the circumference of an imaginary circle having its center coincident with said axis. As rotator 20 turns and traces the light beam across each of the angled mirrors, the beam is reflected therefrom towards the respective scanning slots. Due to the angular orientation of the four mirrors the scanning beam projected towards the scanning slots 25, 26, 27, 28 will sweep around a full circle.

Imagine an article moving across the scanning slots 25, 26, 27, 28 towards the reader. Mirrors 31 and 32 project the scanning beam in a directon away from the reader, sequentially, through slots 26 and 28, respectively, and is able to scan a label appearing on the front or left sides, or front or right sides, respectively. Similarly, the orientation of mirrors 24 and 23 would project the scanning beam, sequentially, through slots 27 and 25 and is able to scan a label appearing on the rear or right sides, or rear or left sides, respectively.

Obviously, for a label appearing on the bottom side of an article, any one of the four scanning beams is able to properly scan it.

Accordingly, the present scanner has the capability of scanning a label-bearing article when the label appears on the bottom, front, rear, or right or left sides. Even articles packaged in irregular configurations such as produce or packages which have become deformed can be similarly read as one or more of the scanning beams sweeps across the label. If a label is not completely scanned by the first sweep by the scanning beam, the missing portions of the label information can be supplied to the decoder during subsequent scanning sweeps, since each article is automatically scanned a large number of times before it can be removed from the scanning slot area.

As discussed previously, coded labels are intended to be scanned by the disclosed device in order to decode the information contained therein. The UPC-type label includes alternate bands of light and dark or otherwise contrasting colors. As the scanning beam sweeps across each one of the four slots which make up the double-X pattern, sequentially, the label is illuminated by the beam one or more times.

Light from the scanning beam will be differentially diffused from the surface of the label—depending on whether a light or dark band is illuminated. Since the scanning beam is constantly moving a modulated train of diffused light pulses will be produced—the intensity and duration of which depending on the color and width of the bands.

The modulated light pulses follow the exact path as the scanning beam which illuminated the article label, thereby constituting a retro-reflective pickup. Assuming beam 27 has scanned a label, the modulated pulses will enter the scanning slot associated with scanning beam 27 and strike mirror 24 which reflects the pulses onto face 43 of rotator 20.

A pair of sensors indicated schematically by 27, 30 in FIG. 1 is disposed in operative proximity to rotator 20. Convex lenses 28, 29 associated, respectively, with sensors 27, 30 gather the modulated light pulses reflected from the faces of rotator 20 and focus the light onto the sensitive elements forming each sensor. In the example above, only sensor 30 will respond to the modulated light pulses striking face 43 of rotator 20.

Therefore, the sensor will perceive a series of light pulses of varying intensity and duration corresponding to the bars on the coded label. The sensor, being a transducer, changes the received light energy to a corresponding electrical signal which may then be amplified and fed to appropriate decoding circuitry.

Alternatively, since the light returning from the scanned article follows a truly retro-reflective path, a single sensor may be disposed behind beamsplitter 15 along the path of ray 14a. Mirror 13 may be of the half-silvered, partially-transmissive type enabling the sensor to be placed behind it along an extension of the path of ray 14a.

Figure 2:
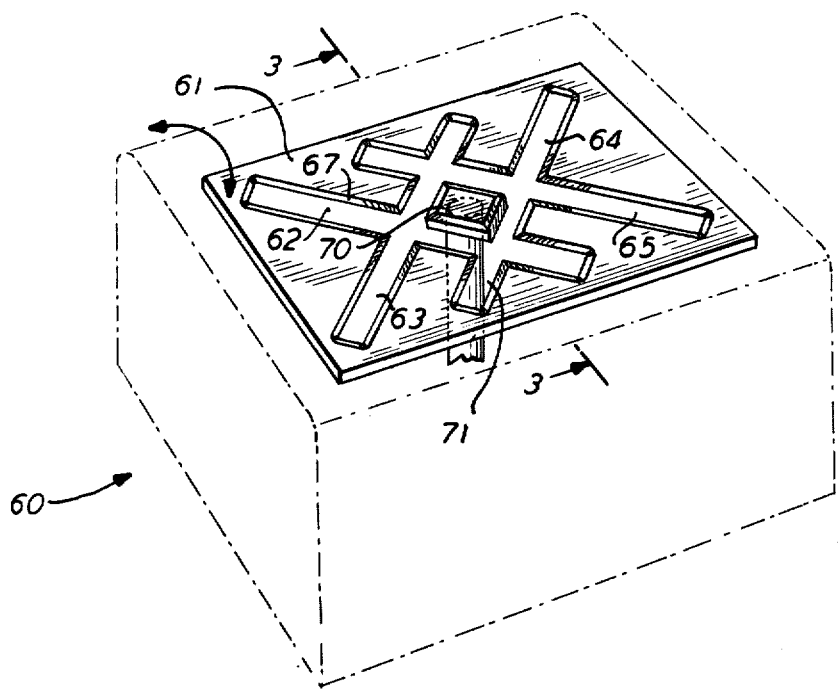
FIG. 2 is a perspective view illustrating the nature of the scanning slot area according to the invention.

Referring now to FIG. 2, there is shown a portion of a checkstand 60 also forming part of the novel scanning system. As is evident, the double-X scanning pattern has been carried out in a cover plate 61, the top surface of which being flush with the checkstand countertop.

Figure 3:
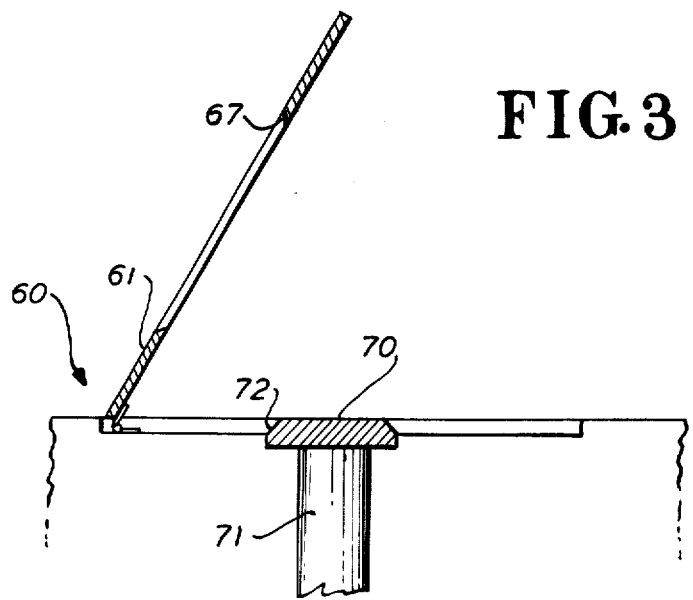
FIG. 3 is a sectional view taken along line 3—3 of FIG. 2.

The first X-slot, comprised of two slots 62, 63 of equal length intersecting at right angles meshes with the second X-slot, comprised of equal length slots 64 and 65 forming a grid. The slots are formed in cover plate 61 which may be detachably mounted on or secured by hinges, as shown in FIG. 3, to the associated countertop and housing for the optical components. The cover plate 61 can thus be moved to retrieve any debris which may have fallen through the slots into the housing interior. Obviously, any such debris will have fallen out of the path of any of the light rays thus preventing interference with the operation of the apparatus.

The edge of the plate 61 forming slots 61, 62, 63, and 64 may be provided with a beveled edge 67 to reduce the possibility of catching the edge of the opposing slot edge as articles move across the scanning slots.

The central area defined by the intersection of slots 61, 62, 63, and 64, which would otherwise be void and permit articles to fall into the apparatus housing includes a cap 70, the top surface of which is level with the top of plate 61 and the countertop. The edges of cap 70 are similarly beveled 72 to urge articles away from the interior of the housing. Cap 70 is supported by a column 71 which is preferably coaxial with the axis of rotator 20.

The remaining optical components are disposed within the checkstand 60 housing in the area below cover plate 61 and cap 70.

Although, the illustrated embodiment indicates scanning of the articles generally from below as they move along the checkstand 60 countertop across cover plate 61, it is to be understood that the articles can be scanned from above by inverting the position of the equipment housing and passing the articles beneath the scanner at any desired distance from the slots 62 – 65 themselves.

Although there has been illustrated, by way of example, the generation of a double-X scanning pattern, it is also possible, within the scope of the invention, to generate a pattern comprising multiple-X's by simply increasing the number of angled mirrors and appropriately modifying the shape of rotator 20.

Having described the invention, it is obvious that many additional modifications and alternatives are possible without departing from the inventive concept which is to be measured solely from the appended claims.

What is claimed is:

1. Optical scanning apparatus for scanning and sensing information contained on a label-bearing article, comprising:
   a light source;
   a rotatable member having a reflective surface;
   first optical means for directing light from said source to said surface; and
   second optical means for directing light reflected from said surface to form a scanning pattern on a predetermined plane;
   said second optical means comprising fixed reflective means for directing said light by reflection;
   said scanning pattern being comprised of a plurality of segments together forming at least one pair of overlapping cross-shaped traces.

2. Optical scanning apparatus as set forth in claim 1, wherein:
   said reflective means comprises a plurality of mirrors disposed about the axis of rotation of said rotatable member.

3. Optical scanning apparatus as set forth in claim 2, wherein:
   said mirrors are equiangularly spaced with respect to said axis.

4. Optical scanning apparatus as set forth in claim 3, wherein:
   said mirrors are equidistant from said axis.

5. Optical scanning apparatus as set forth in claim 1, wherein:
   said rotatable member is comprised of a plurality of plane-sided faces forming a polygon in cross-section with respect to the axis of rotation of said member.

6. Optical scanning apparatus as set forth in claim 5, wherein:
   said polygon is a regular polygon.

7. Optical scanning apparatus as set forth in claim 6, wherein:
   each of said plane-sided faces is divided longitudinally into two sections;
   said two sections associated with each face forming a dihedral angle having a first value; and
   adjacent sections associated with adjoining faces forming a dihedral angle having a second value;
   said first and second values being unequal.

8. Optical scanning apparatus as set forth in claim 7, wherein:
   said first angle value differs from said second angle value.

9. Optical scanning apparatus as set forth in claim 1, wherein:
   said first optical means comprises a beamsplitter for dividing a light beam from said source into first and second rays; and
   first and second reflectors in the paths of said first and second rays, respectively;
   each reflector directing its associated ray to the surface of said rotatable member.

10. Optical scanning apparatus as set forth in claim 9, further including:
    beamforming lens means interposed between said light source and said first optical means for modifying the diameter of the beam emitted from said source.

11. Optical scanning apparatus as set forth in claim 9, further including:
    focusing lens means interposed between said light source and said first optical means;
    said focusing lens means having a focal point coincident with scanning plane.

12. Optical scanning apparatus as set forth in claim 1, further including:
    sensor means interposed along the optical path between said light souce and said plane;
    said sensor means being adapted to sense scanned information associated with a label-bearing article following a path retro-reflected with respect to a generated scanning beam following said optical path.

* * * * *